United States Patent [19]

Lee

[11] Patent Number: 5,408,475
[45] Date of Patent: Apr. 18, 1995

[54] MODEM WITH TRANSIENT IMPAIRMENT DETECTOR

[75] Inventor: Yong-Hwan Lee, Norwood, Mass.

[73] Assignee: Motorola, Inc., Schaumburg, Ill.

[21] Appl. No.: 205,334

[22] Filed: Mar. 3, 1994

Related U.S. Application Data

[63] Continuation of Ser. No. 962,627, Oct. 16, 1992, abandoned, which is a continuation of Ser. No. 537,676, Jun. 14, 1990, abandoned.

[51] Int. Cl.$^6$ .............................................. H04J 3/14
[52] U.S. Cl. .................................... 371/20.4; 370/13; 370/17; 371/20.1
[58] Field of Search ................. 371/5.1, 5.4, 5.5, 20.1, 371/20.4; 370/13, 14, 17

[56] References Cited

U.S. PATENT DOCUMENTS

| | | | |
|---|---|---|---|
| 4,466,092 | 8/1984 | Renner | 370/13 |
| 4,558,317 | 12/1985 | Armstrong | 340/825.06 |
| 4,606,044 | 8/1986 | Kudo | 375/13 |
| 4,637,035 | 1/1987 | Betts | 375/13 X |
| 4,674,103 | 6/1987 | Chevillat et al. | 375/13 |
| 4,713,810 | 12/1987 | Chum | 371/4 |
| 4,730,302 | 3/1988 | Fuerlinger et al. | 370/13 |
| 4,792,940 | 12/1988 | Hiraguchi | 375/13 X |
| 4,949,355 | 8/1990 | Dyke et al. | 375/10 |
| 5,138,616 | 8/1992 | Wagner, Jr. et al. | 371/5.1 |

OTHER PUBLICATIONS

Bradley, F., "The Hidden Treasures of ESF", *Data Communications*, Sep. 1986.

Harold, P., "Bit-Error-Rate Testers Troubleshoot Data Links in Real Time", *EDN*, Feb. 5, 1987, pp. 69–76.

Goldberg, H., "DDS's Latest Wrinkle: User Diagnostics in a Separate Channel", *Data Communications*, Dec. 1988.

"Frame Alignment in a Digital Carrier System-A Tutorial" by D. W. Choi in IEEE Communications Magazine, pp. 47–54, Feb. 1990.

"AT&T's New Approach to the Synchronization of Telecommunication Networks" by J. Abate in IEEE Communications Magazine, pp. 35–45, Apr. 1989.

"Robust Frame Synchronization for Noisy PCM Systems" by D. Dodds et al. in IEEE Transactions on Communications, vol. COM-33, pp. 465–469, May 1985.

*Primary Examiner*—Stephen M. Baker
*Attorney, Agent, or Firm*—Darleen J. Stockley

[57] ABSTRACT

A frame code word (FCW) is inserted in a time division multiplexed slot in a modem data stream preferably using an embedded secondary channel. A receiving modem demultiplexes the FCW and compares it against the known transmitted FCW. Based upon the number of incorrect FCW's received, a reinitialization command is generated causing the modems to begin a retraining sequence-in view of the detected error condition.

7 Claims, 2 Drawing Sheets

MODEM WITH TRANSIENT IMPAIRMENT DETECTOR

This is a continuation of application Ser. No. 07/962,627, filed Oct. 16, 1992, and now abandoned, which is a continuation of application Ser. No. 07/537,676, filed Jun. 14, 1990, and now abandoned.

Field of the Invention

This invention relates to the detection of performance degradation caused by a transient impairment condition in a data transmission system. It is especially suited for incorporation in a modem to detect certain types of errors such as a frame synchronization error in a time division multiplexed channel over which the modems communicate.

BACKGROUND OF THE INVENTION

A communication channel between modems may include a data communication network such as a T1 or other digital communication link in which data is transmitted in frames. The frames and time slots associated with the data must be synchronized in order to ensure that the received data is the data transmitted by the corresponding transmitting device, not data from another source or out of sequence data from the correct data source.

Errors in received data can be classified into three categories. The first is an occasional bit error such as due to white Gaussian noise of a moderate amplitude relative to the data. The second is a burst bit error where several consecutive bits have errors due to an impulsive or transient type of noise. Burst bit errors can occur due to relatively short undesired amplitude or phase excursions. The third category of errors consists of received data which is totally missing or received data which is totally different from the anticipated transmitted data such as might occur in a time division multiplexed (TDM) digital signalling network. Such errors may result from a frame synchronization error or "slip" in a TDM network.

A loss of frame timing due to burst bit errors usually results in a need to reinitialize the modems. The reinitialization command can be generated by a time-out timer in a data communication front end device (FED) connected to the receiving modem. It would be desirable for the modem itself to detect and handle such a problem rather than responding to a later requested reinitialization command by the FED. This would minimize the amount of erroneous data that has to be retransmitted and re-establish proper data communications with minimum delay.

A frame slip cannot be detected by normal processes and will usually require reinitialization of a modem especially where multiple users are sharing the same modem. Thus, it would be desirable for the modem to be able to sense a loss of frame synchronization in order to initiate reinitialization as soon as possible.

It is an object of the present invention to provide an improved modem and method suited for use with modems for detecting frame synchronization errors associated with the received data.

DETAILED DESCRIPTION

Figure 1A:
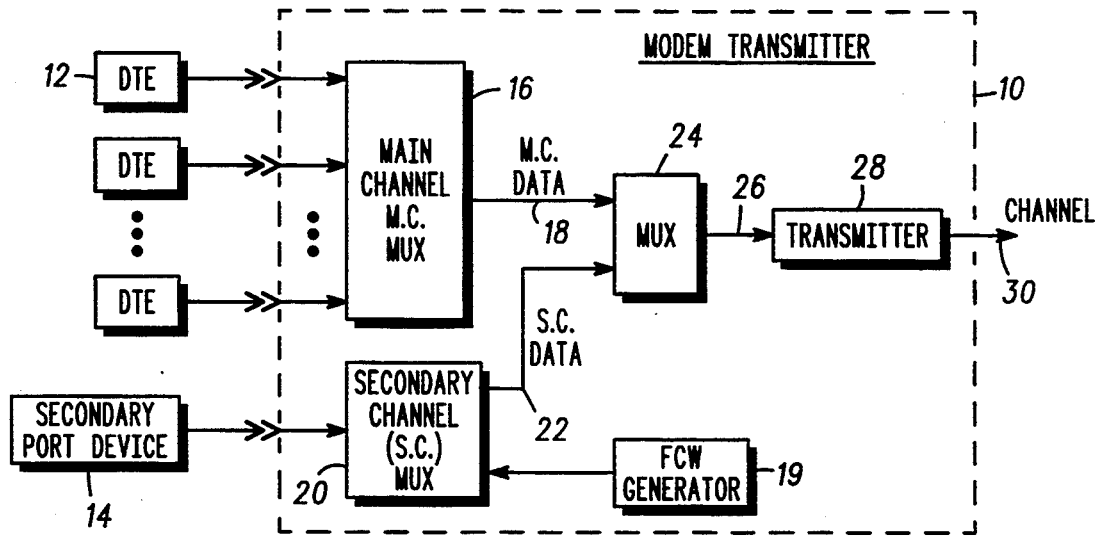
FIGS. 1A and 1B are block diagrams illustrating a modem transmitter and receiver, respectively.

FIG. 1A illustrates a general block diagram of an embodiment 10 of a modem transmitter. The transmitter receives data from a plurality of data terminal equipment (DTE) 12 and a secondary port device 14. A main channel multiplexer 16 multiplexes the user data from the DTE's together to form a single data stream on path 18. Secondary channel multiplexer 20 provides a multiplexed secondary data stream on path 22 which consists of data from device 14 and a frame code word (FCW) from a FCW generator 19 which may consist of a predetermined digital word stored in memory. A multiplexer 24 combines the data stream on paths 18 and 22 and provides a consolidated data stream by path 26 to modem transmitter 28. The output of the transmitter consists of data transmitted over a communication channel 30 which may be a time multiplexed network.

Figure 1B:
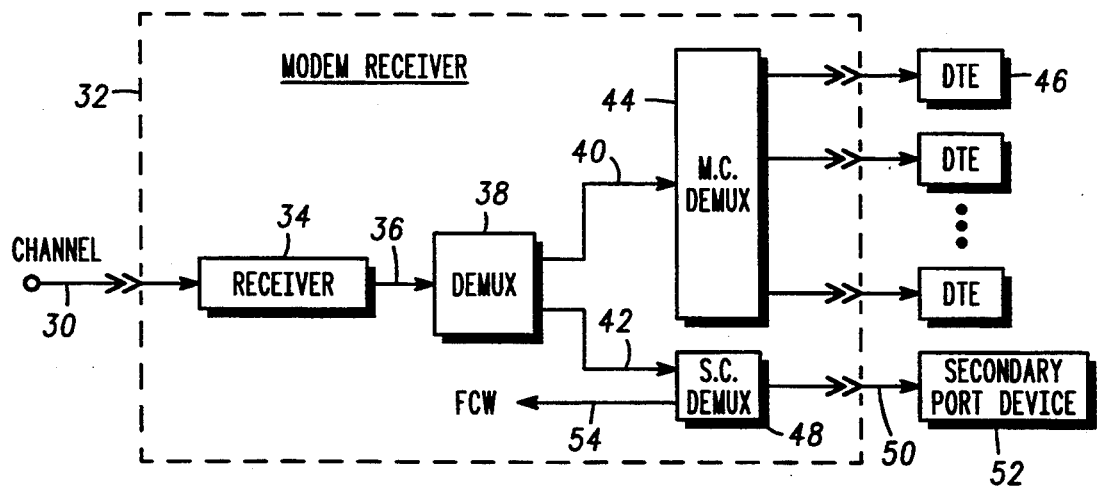

FIG. 1B illustrates a block diagram of an embodiment 32 of a modem receiver. Incoming data is received over communication channel 30 and recovered by receiver 34 which provides an output data stream by path 36 to demultiplexer 38. This demultiplexer provides the inverse function of multiplexer 24, that is it separates the main channel data onto path 40 and the secondary data onto path 42. The main channel data is coupled to demultiplexer 44 which provides the inverse function of multiplexer 16 thereby separating the main channel data into corresponding data streams sent to DTE's 46 which correspond to originating DTE's 12. The combined secondary channel data provides an input on path 42 to secondary channel demultiplexer 48 which separates the data into data transmitted by device 14 which is carried on path 50 to corresponding secondary port device 52 and the FCW data on path 54. The FCW data is utilized as discussed in reference to FIGS. 4 and 5.

Figure 2:
FIG. 2 illustrates a data transmission protocol in which main channel data and secondary channel data are sent in frames.

FIG. 2 illustrates the data format as transmitted by modem transmitter on channel 30. The time multiplexed information consists of repetitive frames consisting of main channel data and secondary channel data.

Figure 3:
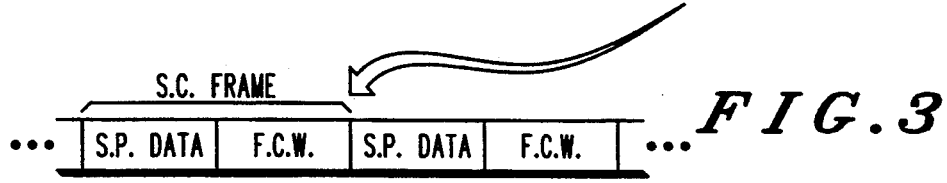
FIG. 3, illustrates a data transmission protocol illustrating secondary port data and frame code words.

FIG. 3 illustrates the secondary channel frame format. It consists of a first segment of secondary port device data followed by the frame control word. The secondary port device data may consist of network management or control data used for network control. The frame control word consists of a predetermined digital word utilized in the detection of received data errors as will be explained in detail below. The main channel data consists of data desired to be transmitted by one or more users. The number of bits in an S.C. frame may exceed the number of bits available as S.C. data (FIG. 2) in one frame thereby requiring a number of FIG. 2 frames to send one S.C. frame (FIG. 3).

Figure 4:
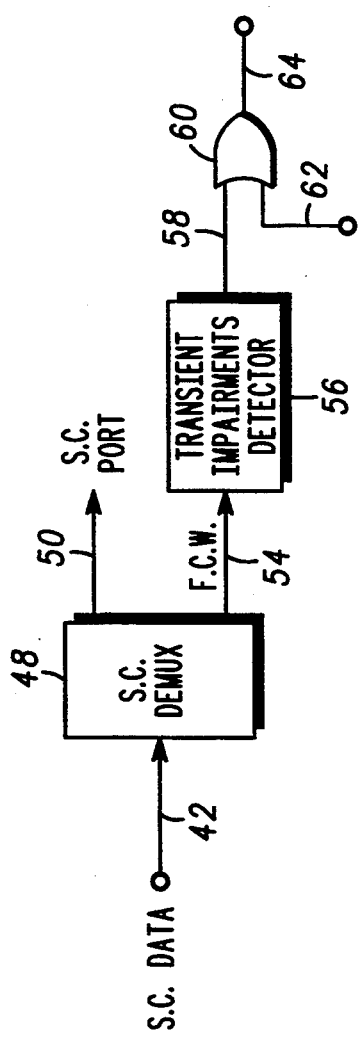
FIG. 4, illustrates a block diagram of functions in a data receiver for processing the frame code words in accordance with the present invention.

FIG. 4 is a block diagram illustrating the implementation of an embodiment of the present invention in a modem receiver. The transient impairment detector 56 receives the frame code word by path 54 and provides an output by path 58 to OR gate 60. The output 64 from this gate consists of an error detection command. This command will be coupled to conventional control logic associated with the modem to cause the modem to begin a reinitialization or retraining procedure with the corresponding modem with which it is communicating. Another input 62 to gate 60 provides a means where other types of errors detected by the receiver can be utilized to generate the same command. For example, a determination of an excessive bit error rate could also .be utilized to generate the command.

Figure 5:
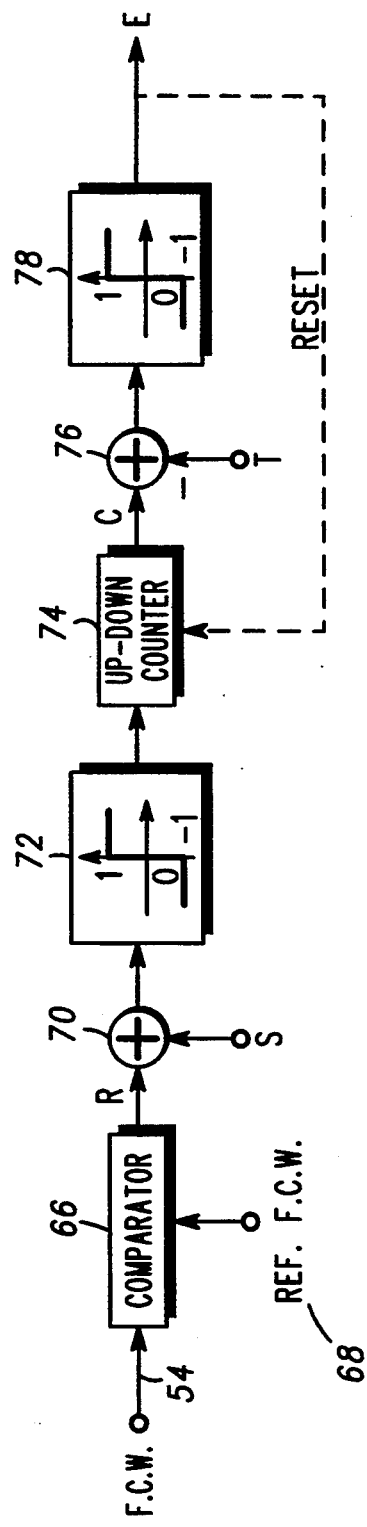
FIG. 5 is a block diagram of an embodiment of the transient impairment detector of FIG. 4.

FIG. 5 shows a detailed block diagram of transient impairment detector 56. The received FCW comprises an input to comparator 66 which compares this digital word with the predetermined FCW word provided by storage element 68. This comparison may consist of a Hamming distance measurement in which the cumulative difference between corresponding bits in digital words is measured. The output of comparator 66 may consist of an integer R. A summer 70 subtracts a predetermined number S from R, where S is related to the average expected integer value of R under normal operation. Thus, S can be utilized to adjust the average magnitude of the output of summer 70.

A level shifting circuit 72 converts the output of summer 70 into a 1 if the output was 1 or greater and converts the output to a minus 1 if the output of summer 70 was 0 or less. Thus, up/down counter 74 receives either a plus 1 increment or a minus 1 increment when each FWC word is compared. The counter 74 is preferably initialized to 0 and is constrained to have a minimum count of 0. The output C of the counter is summed by summer 76 which subtracts a threshold value T from count C. The output of summer 76 goes to a comparator 78 which provides an error command signal E if the output of summer 76 is 1 or greater. Threshold T can be utilized to set a predetermined minimum number of comparisons by comparator 66 found to be in error before the error detection command signal E is generated. Upon generation of command E, up/down counter 74 is reset to 0.

It will be appreciated by those skilled in the art that up/down counter 74 consists of an average of received frame code words received in error relative to the number of correctly received frame control words over the length of the counter. The threshold value T can be utilized to prevent undesired error detection caused by an occasionally erroneously received FCW. Those skilled in the art will appreciate that the present invention can be implemented in hardware or software according to design choice.

To further illustrate the operation of the present invention, an exemplary example is provided. For this example it is assumed that the modem is operating at 2400 baud and that the secondary channel data is multiplexed with the main channel data stream by inserting 1 bit of secondary channel data for every 16 baud. Thus, 150 bps of secondary channel data is available. If 75 bps is required by the secondary port device 14, this leaves 75 bps available for sending the FCW. The secondary channel frame can consist of 8-bits secondary port data followed by 7-bits FCW. Therefore, 150/(8+7) or 10 complete secondary channel frames can be sent each second. Further assume S=O and T=10. If the threshold T is chosen such that the expected (average) detection time is about 1 second, it has been found that the detector performance results in a reasonable compromise between false error detections and requiring too long a duration for desired error detection. It will be appreciated by those skilled in the art that this parameter may be adjusted in accordance with the average communication channel conditions and network operating environment.

FIG. 2 can be interpreted in view of this example as the main channel data consisting of 16 baud of main channel data and followed by 1 bit of the secondary channel data. This repeats as a frame. In FIG. 3, the secondary channel frame consists of secondary port device data followed by a 7 bit FCW, wherein the same FCW is repeated during each secondary channel frame. For efficient implementation, the secondary channel data can be multiplexed with the main channel data by inserting 1 bit of secondary channel data for a predetermined number of bauds. This allows the multiplexing and modulation scheme to remain the same regardless of the main channel data rate.

Although a description of an embodiment of the present invention has been described and shown in the drawings, the scope of the invention is defined by the claims which follow.

What is claimed is:

1. A method for detecting data errors at a second modem of data transmitted by a first modem over a data communication system, each modem including first and second time multiplexed channels, the method comprising the steps of:

the first modem periodically transmitting a predetermined frame code word on said second channel;

the second modem comparing said predetermined frame code word and received frame code words recovered from said second channel, wherein the comparing step includes step of determining the amount of difference between said predetermined frame code word and received frame code words;

generating an error detection factor based on said comparisons;

making an error detection decision if said factor exceeds a threshold value, said error detection decision being implemented independently of operation of both the first channel and the second channel (being user and network transparent).

2. The method according to claim 1 further comprising the step of said second modem demultiplexing information carried by said second channel into separate corresponding data streams.

3. The method according to claim 1 further comprising the step of said second modem demultiplexing said second channel to separate said second data from said received frame code words.

4. A modem for receiving data over a data communication channel and providing continuous detection of loss of synchronization due to transient channel impairment by observing synchronization loss and then initiating modem retraining for fast recovery from synchronization loss evidenced by error detection in excess of a predetermined value, comprising:

means for receiving incoming data over said data communication channel;

means for extracting frame code words occurring periodically in said incoming data;

means for comparing said received frame code words with a predetermined frame code word to determine differences, if any;

means for generating synchronization loss degradation factors based on said differences;

means for generating a synchronization loss decision upon said (calculated) performance degradation factors reaching a predetermined threshold value, said decision being implemented transparently to a user and a network utilizing the data communication channel and such that error detection is automatically continuously implemented concurrently with received data, further comprising means for causing said modem to start retraining with a corresponding remote modem upon generation of said synchronization loss decision, wherein said synchronization loss factor generating means generates said factor based upon the number of said comparisons having said difference, and wherein said predetermined threshold value is selected such that a minimum number of said comparisons having differences are required before said synchronization loss decision can be generated, and wherein said predetermined threshold value is selected such that a minimum number of said comparisons having differences are required before said synchronization loss decision can be generated.

5. The modem according to claim 4 wherein said threshold value is selected to require a predetermined minimum number of said comparisons having said difference to occur before said synchronization loss decision is generated.

6. The modem according to claim 4 wherein said means for extracting comprises means for demultiplexing said incoming data into at least a first and second data stream, said frame code words being contained in said second data stream.

7. The modem according to claim 6 wherein said second data stream includes second data in addition to said frame code words.

* * * * *